No. 747,914. PATENTED DEC. 22, 1903.
N. HARRISON & J. WHARTON.
MACHINE FOR ROLLING GLASS.
APPLICATION FILED OCT. 23, 1902.
NO MODEL. 2 SHEETS—SHEET 1.
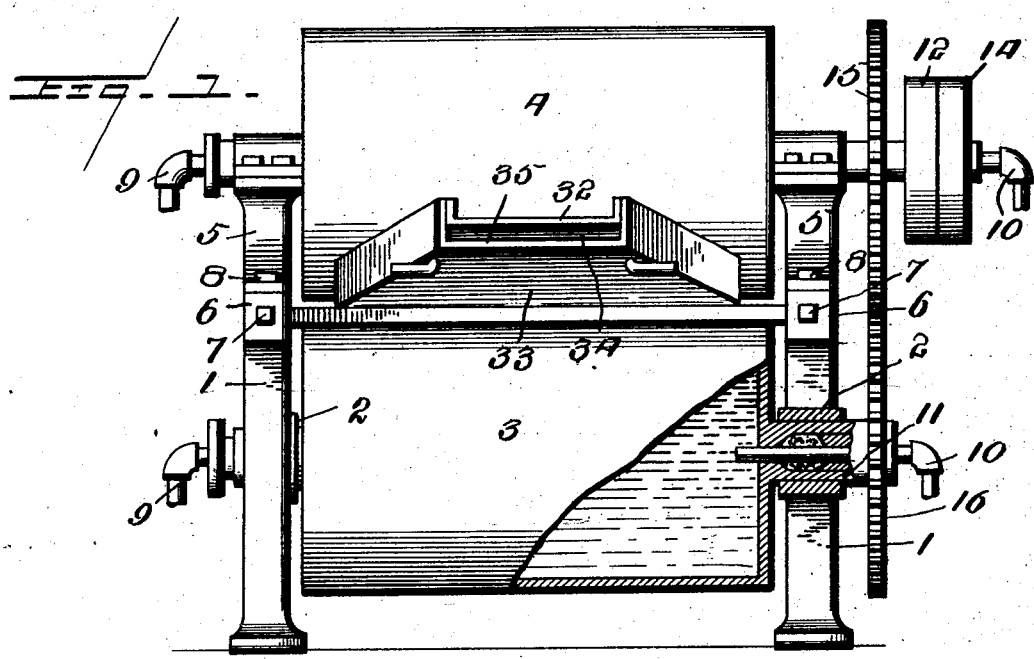
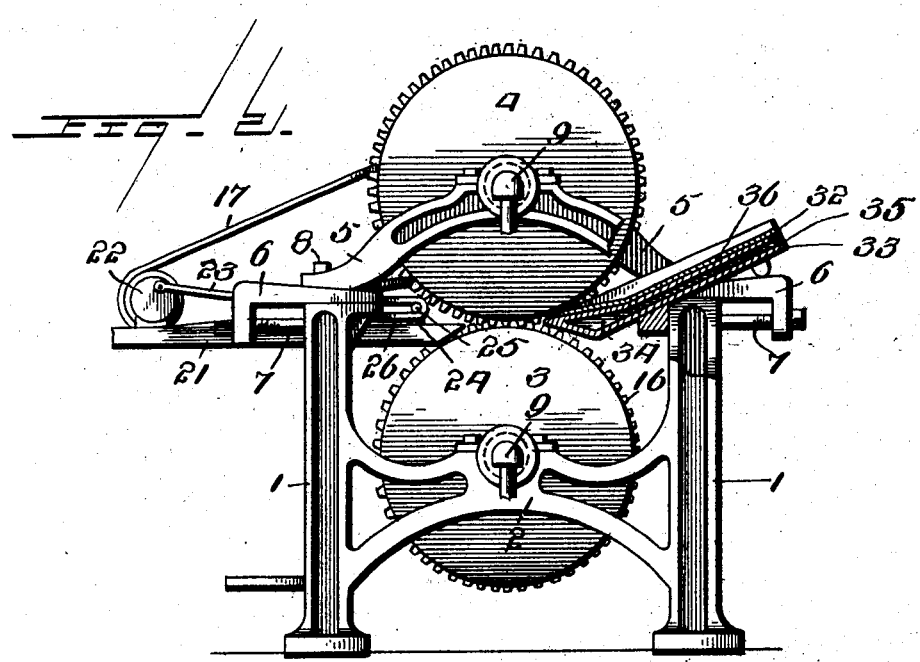
WITNESSES:
Wm. F. Doyle
E. K. Allen
INVENTORS
Nicholas Harrison
Joseph Wharton
BY H. C. Evert & Co.
Attorneys No. 747,914. PATENTED DEC. 22, 1903.
N. HARRISON & J. WHARTON.
MACHINE FOR ROLLING GLASS.
APPLICATION FILED OCT. 23, 1902.
NO MODEL. 2 SHEETS—SHEET 2.
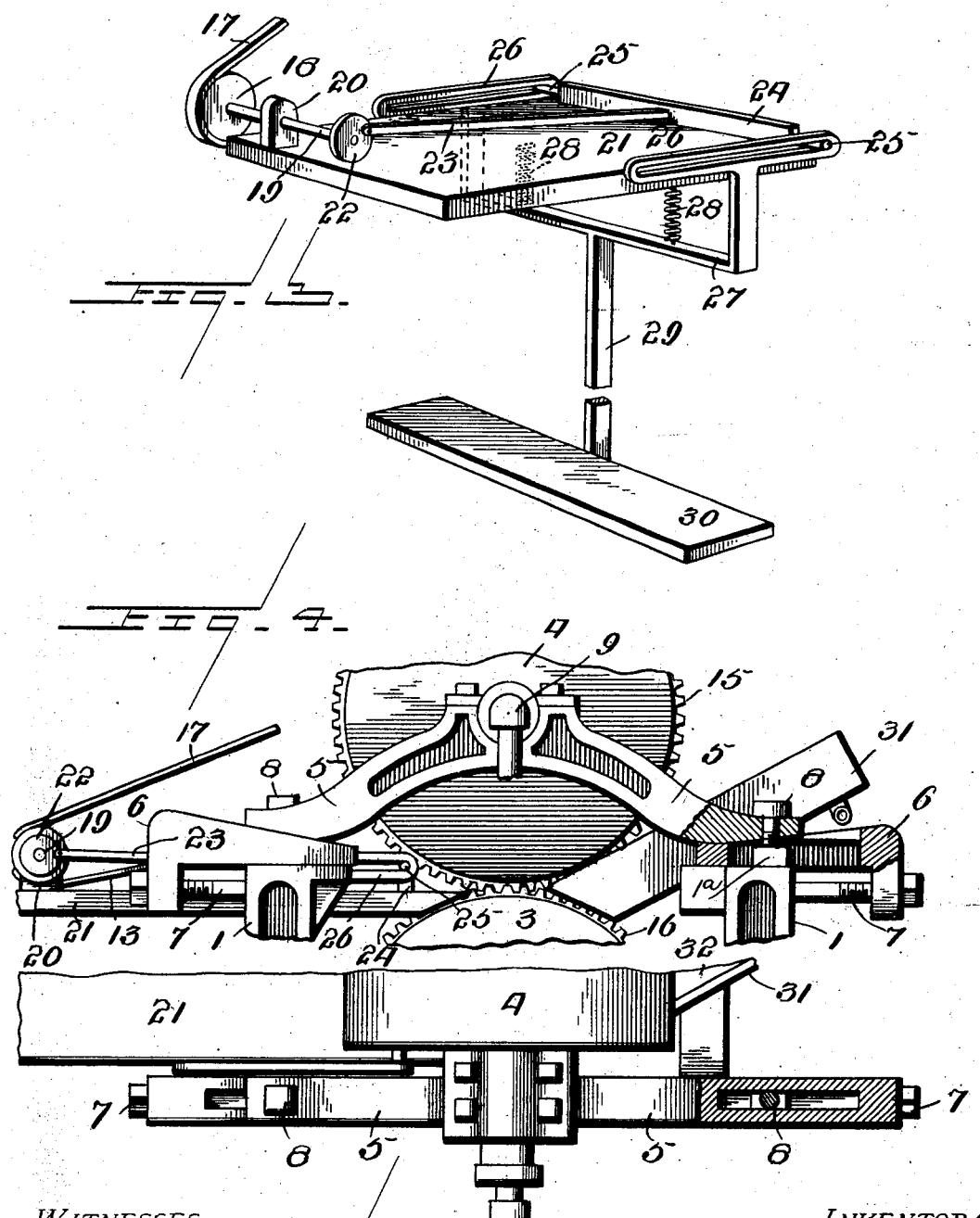
WITNESSES:
W. F. Doyle
E. K. Allen
INVENTORS
Nicholas Harrison,
Joseph Wharton.
BY
H. C. Evert & Co.
Attorneys No. 747,914.

Patented December 22, 1903.

UNITED STATES PATENT OFFICE.

NICHOLAS HARRISON AND JOSEPH WHARTON, OF MONONGAHELA, PENNSYLVANIA, ASSIGNORS OF ONE-THIRD TO SAMUEL R. WIGHTMAN, OF MONONGAHELA, PENNSYLVANIA.

MACHINE FOR ROLLING GLASS.

SPECIFICATION forming part of Letters Patent No. 747,914, dated December 22, 1903.

Application filed October 23, 1902. Serial No. 128,481. (No model.)

*To all whom it may concern:*

Be it known that we, NICHOLAS HARRISON and JOSEPH WHARTON, citizens of the United States of America, residing at Monongahela, in the county of Washington and State of Pennsylvania, have invented certain new and useful Improvements in Machines for Rolling Glass, of which the following is a specification, reference being had therein to the accompanying drawings.

This invention relates to certain new and useful improvements in machines or apparatus for rolling glass sheets, and has for its object to construct a machine by means of which glass sheets or plates may be advantageously produced by rolling instead of by the ordinary method of blowing the glass into the form of a cylinder, then splitting the same, and finally flattening into the sheet.

Our invention contemplates the passing of the molten glass direct from the tank to a trough or pan having inwardly-diverging sides and a gradually-widening surface on which the inflowing material is permitted to spread, the trough or pan being inwardly inclined and so placed with respect to the rolls as to feed the molten glass between the rolls, which form the glass into a flat sheet that is conducted while still hot and pliable onto a horizontal table, where a reciprocated knife separates or cuts the sheet into the desired sizes and from which table the plates or sheets are removed by suitable means and placed in an oven for restoring transparency to the glass. The trough or pan and the rolls employed in our improved machine are water-cooled, whereby they may be maintained at a temperature which will permit of their performing the function of respectively cooling the trough or pan and rolling the glass without the latter adhering to the trough or pan and the rolls.

Our improved machine will be hereinafter more specifically described in detail and then particularly claimed, and in describing the invention in detail reference will be had to the accompanying drawings, forming a part of this specification, and wherein like numerals of reference will be employed for designating like parts throughout the several views of the drawings, in which—

Figure 1 is a detail rear elevation of our improved machine, partly broken away to better show the construction of the rolls. Fig. 2 is a side elevation of the machine, showing the feeding pan or trough in section. Fig. 3 is a detail perspective view of the knife mechanism and table detached. Fig. 4 is a detail side elevation of the upper roll-bearing, partly in section. Fig. 5 is a top view thereof, partly in section.

This application is to be considered in connection with an application for improvements in the process of rolling glass as filed by us September 12, 1902, Serial No. 123,062.

To put our invention into practice, we provide a pair of housings 1, each of which carry bearing-brackets 2, in which the lower roll 3 is suitably journaled. The upper roll 4 is journaled in bearing-brackets 5, which are mounted upon the housings 1, and in order to increase or decrease the size of the pass between the two rolls we mount the bearing-brackets 5 upon suitable wedges 6, which are carried on the housings 1 and are adjusted by screws 7, engaging into the reduced parts 1ª of the housings 1, these wedges 6 in practice being slotted, so that they may be moved inwardly or outwardly by the loosening of the securing-bolts 8 and the turning of the screws 7, the bolts 8 riding in the slots in the wedges. The rolls 3 and 4 and their journals are hollow, and extending through the hollow journals of each of the rolls at one end is a water-supply pipe 9, and extending through the opposite hollow journal of each roll is a water-outlet pipe 10, thus keeping up a circulation of water through the rolls in order to keep the same comparatively cool at all times. A suitable stuffing-box 11 is arranged in each of the hollow journals of the rolls. The hollow journal at one end of each roll is extended, and on the upper journal are mounted pulleys 12 14, and on the extended hollow journal of the lower roll is mounted a gear 16 to mesh with a gear 15 on the hollow journal of the upper roll. The pulley 14 of the upper roll is adapted to receive a suitable drivebelt 17, (not shown,) and the pulley 12 receives a belt for driving the knife mechanism, as will be hereinafter described.

The knife mechanism comprises, in connection with a suitably-supported table 21, a shaft 19, mounted in a bearing 20 on the table and provided at its outer end with a pulley 18 to receive the belt 17, passing over said pulley and over the pulley 12. The other end of this shaft carries a disk 22, to which is eccentrically connected one end of a pitman 23, the other end of the pitman being connected to the knife 24. This knife 24 is adapted to sever the rolled sheet into the desired sizes. To this end the knife is provided at its ends with studs 25, which ride in slotted links 26, carried by the U-shaped bracket 27, that is suspended from the table 21 by means of springs 28. A lever 29 is connected centrally to this U-shaped bracket 27 and has a treadle 30 at its lower end. The table 21 may be supported in any suitable manner from the housings and extends inwardly in close proximity to the pass between the rolls, its inner end being beveled for this purpose. A feeding trough or pan is provided at the other side of the rolls, into which the molten glass is conducted direct from the tank by any suitable connection. (Not shown.) This pan 31 has an intermediate bottom 32, which lies at an incline for the major portion of its width and then extends on a substantially horizontal line into the pass between the two rolls. Between the bottom 32 and the bottom 33 of the pan is a water-space 34, with which a suitable water-supply is connected, this water-space being provided with overflow-outlet 35. The side walls or flanges of the pan converge toward each other, as best seen in Fig. 1 of the drawings, whereby the inlet to the pan is contracted considerably relative to its width at the end which discharges into the pass between the rolls. In Fig. 2 the glass as it flows upon the pan is designated by the numeral 36.

In operation the molten glass is conducted from the tank into the feeding trough or pan and flows down and spreads in said pan or trough into the pass between the rolls and is rolled out into a sheet or plate and delivered onto the table. When a sheet or plate of the desired size has been delivered onto the table 21, the operator places his foot on the treadle and depresses the same, thus causing the knife to descend into engagement with the sheet or plate, which is still hot and pliable, and owing to the fact that the shaft 19 is being continually driven the knife 24 is reciprocated over the table until such time as the cut is made, and when the operator releases the pressure of the treadle the springs 28 return the knife to its elevated position and the same is again reciprocated, due to the rotation of shaft 19, so as to bring the knife into position again for another cut.

It will be understood from the foregoing description that the knife is continuously reciprocated and is depressed at the point where it is desired to sever the sheet and immediately released, so that there is no damming of the plastic material, while the material is not sufficiently plastic after being cut with the cold knife to reunite the severed edges.

While we have herein shown and described the machine in detail, yet it will be observed that in the practice of the invention various changes may be made in the details of construction without departing from the general spirit of our invention.

Having fully described our invention, what we claim as new, and desire to secure by Letters Patent, is—

1. A machine for rolling molten glass comprising a hollow liquid-cooled trough having an inclined surface upon which the molten glass is fed and is permitted to spread, a pair of hollow rolls arranged in a vertical plane in advance of the inclined surface of the trough providing surfaces between which the sheet is led horizontally, said rolls having hollow journals, inlet and outlet pipes connected with the hollow journals for conveying cooling liquid into and from the hollow rolls, a table having a horizontal surface which receives the sheet in plastic condition as it is advanced from the pair of rolls, a knife located across the table, means for lowering the knife for severing the sheet into sections, and means for returning the knife to normal position.

2. A machine for rolling molten glass comprising a hollow liquid-cooled trough having an inclined surface upon which the molten glass is fed and is permitted to spread, housings having lower and upper bearing-brackets, a pair of hollow rolls arranged in a vertical plane in advance of the inclined surface of the trough providing surfaces between which the sheet is led horizontally, said rolls having hollow journals whereby the hollow rolls are mounted in the bearing-brackets, inlet and outlet pipes connected with the hollow journals for conveying cooling liquid into and from the hollow rolls, a table having a horizontal surface which receives the sheet in plastic condition as it is advanced from the pair of rolls, a knife located across the table, means for lowering the knife, for severing the sheet into sections, and means for returning the knife to normal position.

3. A machine for rolling molten glass comprising a trough having an inclined surface upon which the molten glass is fed and permitted to spread, housings having upper and lower bearing-brackets, the slotted wedges arranged lengthwise of the machine between the housings and the upper brackets, the adjusting-screws working through the wedges into the housings, the vertical securing-bolts extending through the upper brackets and slotted wedges and into the housings, a pair of rolls arranged in a vertical plane in advance of the inclined surface of the trough, providing surfaces between which the sheet is led horizontally having journals whereby the rolls are mounted in the bearing-brackets, a table having a horizontal surface which receives the sheet in plastic condition as it is advanced from the pair of rolls, a knife located across the table, means for lowering the knife, and severing the sheet into sections, and means for returning the knife to normal position.

4. A machine for rolling molten glass comprising a trough having an inclined surface upon which the molten glass is fed and is permitted to spread, a pair of rolls arranged in a vertical plane in advance of the inclined surface of the trough, providing surfaces between which the sheet is led horizontally, a table having a horizontal surface which receives the sheet in plastic condition as it is advanced from the pair of rolls, a knife located across the table, means for reciprocating the knife lengthwise of the table, means for lowering the knife for severing the sheet into sections, and means for returning the knife to normal position.

5. A machine for making sheet-glass comprising rolls, a table, a shaft having a pulley and supported by the table, a spring-frame having links and a lever for operating the frame, a knife mounted in the links, and means for connecting the shaft with the knife for reciprocating the knife over the table.

In testimony whereof we affix our signatures in the presence of two witnesses.

NICHOLAS HARRISON.
JOSEPH WHARTON.

Witnesses:
C. FRANCIS LINN,
GEO. T. LINN.